United States Patent [19]

Nakai

[11] Patent Number: 4,973,463
[45] Date of Patent: Nov. 27, 1990

[54] CARBON BLACK FOR TIRE TREAD

[75] Inventor: Kiyonari Nakai, Aichi, Japan

[73] Assignee: Tokai Carbon Co., Ltd., Tokyo, Japan

[21] Appl. No.: 342,784

[22] Filed: Apr. 25, 1989

[30] Foreign Application Priority Data

Aug. 5, 1988 [JP] Japan ................... 63-195850

[51] Int. Cl.$^5$ ............... C01B 31/00; C01B 31/02; C09C 1/48
[52] U.S. Cl. ........................... 723/445; 423/450
[58] Field of Search ................... 423/445, 450

[56] References Cited

U.S. PATENT DOCUMENTS

| | | | |
|---|---|---|---|
| 3,830,774 | 8/1974 | Jordan | 260/42.46 |
| 3,864,305 | 2/1975 | Jordan | 260/42.47 |
| 3,973,983 | 8/1976 | Jordan | 106/307 |
| 4,035,336 | 7/1977 | Jordan | 260/42.47 |
| 4,250,145 | 2/1981 | Pobst et al. | 423/450 |
| 4,289,743 | 9/1981 | Ruble | 423/450 |
| 4,316,881 | 2/1982 | Pobst et al. | 423/450 |
| 4,500,672 | 2/1985 | Suzuki et al. | 423/445 |
| 4,784,695 | 11/1988 | Mito et al. | 423/450 |

Primary Examiner—Gary P. Straub
Assistant Examiner—Lori F. Cuomo
Attorney, Agent, or Firm—Armstrong, Nikaido, Marmelstein, Kubovcik & Murray

[57] ABSTRACT

The present invention discloses carbon black for a tire tread having a cetyltrimethyl ammonium bromide specific surface area (CTAB) of 120 to 160 m$^2$/g, a dibutyl phthalate absorption number of compressed sample (24M4) of 95 to 135 ml/100 g, and a tinting strength (Tint) of 100 to 150% and exhibits an M value defined by the following formula (1) and satisfying the following formula (2):

$$M = [24M4]^3 \times [Tint] \times \frac{[IA]^2}{[N_2SA]^2} \times \frac{[\overline{D}st]}{[\Delta Dst]} \times 10^{-6} \quad (1)$$

$$465 - 1.88\,[CTAB] \leq M \leq 465 - 1.18\,[CTAB] \quad (2)$$

wherein IA is the iodine adsorption number (mg/g), N$_2$SA is the nitrogen adsorption specific surface area (m$^2$/g), $\overline{D}$st is the equivalent Stokes diameter (nm) at the maximum absorbance of the distribution curve of aggregates determined by the centrifugal classification method, and ΔDst is the difference (nm) between two equivalent Stokes diameters at two points on the distribution curve of aggregates at which the absorbance is 50% of the maximum absorbance.

1 Claim, 1 Drawing Sheet

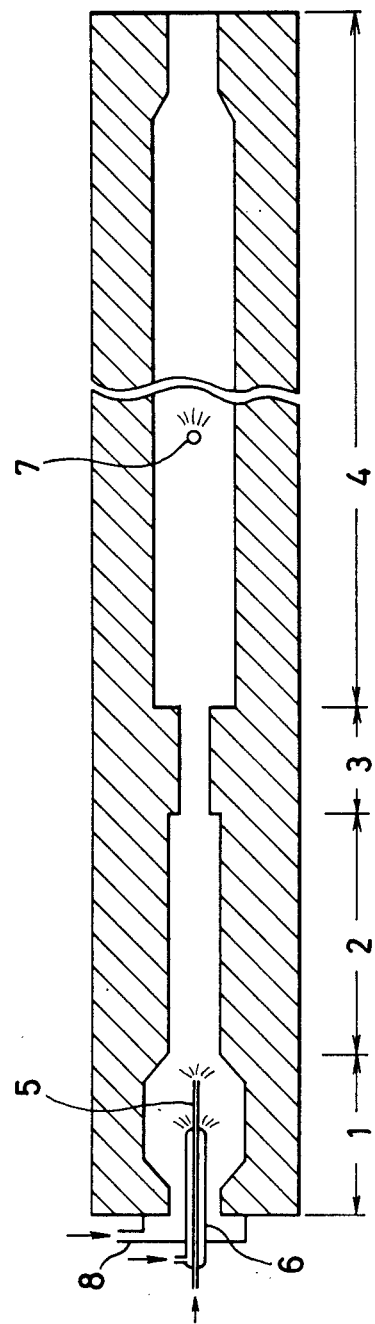

CARBON BLACK FOR TIRE TREAD

BACKGROUND OF THE INVENTION

The present invention relates to carbon black suitable for use in a tire tread where high abrasion resistance is required, and more particularly to carbon black having novel characteristics useful particularly for use in the tread of a large-size tire for trucks, buses, etc.

There are many kinds of carbon black for reinforcement of rubber having various characteristics. The characteristics of carbon black are a major factor determining various properties of rubber containing, added thereto, carbon black and various compounding ingredients (hereinafter referred to as "compounded rubber").

For this reason, in compounding carbon black with rubber, carbon black having characteristics suitable for final applications of the compounded rubber has been usually selected and used.

For example, it is known that carbon black having a small particle diameter and a large specific surface area, such as SAF (Super Abrasion Furnace Black) N110 and ISAF (Intermediate Super Abrasion Furnace Black) N220, are useful as carbon black for a tire tread where high abrasion resistance is required.

However, because of the small particle diameter, SAF(N110) and ISAF(N220) increase the viscosity, hardness, etc. of the kneaded product in the step of mixing with a rubber component, which makes it difficult to homogeneously disperse carbon black in the rubber component. This brought about a problem that not only the energy and time necessary for the homogeneous dispersion of carbon black was increased but also the quality was deteriorated due to a lowering in the dispersion processability of the formed compounded rubber.

Accordingly, an object of the present invention is to provide carbon black for a tire tread having novel characteristics which can be easily dispersed in a rubber component even in the case of a small particle diameter, prevent deterioration of the quality of the compounded rubber, and impart high abrasion resistance to the compounded rubber.

SUMMARY OF THE INVENTION

A first object of the present invention is to provide carbon black for a tire tread which can impart high abrasion resistance to compounded rubber.

A second object of the present invention is to provide carbon black for a tire tread which can be easily dispersed in a rubber component and prevent a lowering in the processability in the step of mixing and deterioration of the quality.

BRIEF DESCRIPTION OF THE DRAWINGS

FIG. 1 is a schematic vertical sectional view of a reactor used for producing the carbon black of the present invention.

DESCRIPTION OF THE PREFERRED EMBODIMENTS

The carbon black for a tire tread according to the present invention has a cetyltrimethyl ammonium bromide specific surface area (CTAB) of 120 to 160 m$^2$/g, a dibutyl phthalate absorption number of compressed sample (24M4) of 95 to 135 ml/100 g, and a tinting strength (Tint) of 100 to 150% and exhibits an M value defined by the following formula (1) and satisfying the following formula (2):

$$M = [24M4]^3 \times [\text{Tint}] \times \frac{[IA]^2}{[N_2SA]^2} \times \frac{[Dst]}{[\Delta Dst]} \times 10^{-6} \quad (1)$$

$$465 - 1.88\,[\text{CTAB}] \leq M \leq 465 - 1.18\,[\text{CTAB}] \quad (2)$$

In the above formula (1), IA is the iodine adsorption number (mg/g), N$_2$SA is the nitrogen adsorption specific surface area (m$^2$/g), D$_{st}$ is the equivalent Stokes diameter (nm) at the maximum absorbance of the distribution curve of aggregates determined by the centrifugal classification method, and ΔDst is the difference (nm) between two equivalent Stokes diameters at two points on the distribution curve of aggregates at which the absorbance is 50% of the maximum absorbance.

The above-described characteristics, i.e., a CTAB of 120 to 160 m$^2$/g, a 24M4 of 95 to 135 ml/100 g, and a Tint of 100 to 150%, are requirements for imparting suitable abrasion resistance and dispersion processability to the compounded rubber. When these characteristics are respectively below the above-described ranges, intended high abrasion resistance cannot be attained. On the other hand, when the characteristics respectively exceed the above-described ranges, not only the dispersion processability is remarkably lowered but also the hardness of the rubber component is increased.

In general, the abrasion resistance of the compounded rubber can be improved by increasing the CTAB value. However, in this case, the processing performance is remarkably lowered. Further, as CTAB increases, 24M4 lowers and N$_2$SA increases. Therefore, an increase in the CTAB value brings about a lowering in the above-described M value.

On the other hand, the M value in the present invention is a parameter determined by taking into consideration the impartation of high abrasion resistance to the compounded rubber through an increase in the 24M4 and Tint values and the improvement in the processability of the compounded rubber through an increase in the IA/N$_2$SA ratio and $\overline{D}$st/Δst ratio. Further, the carbon black of the present invention is characterized in that the M value is on a high level although the CTAB value is on the same level as that of conventional carbon black. In other words, it is possible to attain a combination of high abrasion resistance with excellent processability when carbon black has such characteristics that CATB, 24M4, and Tint are 120 to 160 m$^2$/g, 95 to 135 ml/100 g, and 100 to 150%, respectively, and the M value satisfies the relationship of 465−1.88 [CTAB]≦M≦465−1.18 [CTAB].

In general, carbon black having a small particle diameter and a high N$_2$SA value exhibits a high Tint but causes the 24M4 value to be lowered because the growth of the structure is inhibited, so that not only the improvement in the abrasion resistance is limited but also the dispersion processability is remarkably lowered. The carbon black of the present invention exhibits a combination of a high Tint value with a high 24M4 value on the same specific surface area level. This characteristic requirement in combination with the function of the CATB, 24M4, Tint, and M values imparts high abrasion resistance without remarkably decreasing the particle diameter and, at the same time, has the effect of suppressing an increase in the hardness and attaining homogeneous dispersion.

Consequently, the carbon black of the present invention can impart a combination of homogeneous dispersion with high abrasion resistance and therefore can sufficiently satisfy the performance requirements of the tread for a large-size tire of trucks, buses, etc. used under severe travel environments.

Particular characteristics of the carbon black of the present invention can be measured by the following methods.

(1) CTAB

CTAB was measured according to ASTM D3765-80 "Standard Test Method for Carbon Black-CTAB (Cetyltrimethyl Ammonium Bromide) Surface Area".

(2) 24M4

24M4 was measured according to ASTM D3493-85a "Standard Test Method for Carbon Black-Dibutyl Phthalate Absorption Number of Compressed Sample".

(3) Tint

Tint was measured according to JIS K6221-82 "Testing Methods of Carbon Black for Rubber Industry", Article 6.1.3. IRB#3 was used as a comparative sample.

A dry carbon sample in an amount of 0.1000 g (+0.0002 g) is mixed with 3.000 g of zinc oxide and 1.50 ml of linseed oil by using a Hoover type muller with 125 rotations (25 rotations in one mixing, repeated 5 times) under a load of 6.8 kg (15 lbs). The resulting paste is applied in a prescribed thickness onto a glass plate using a film applicator (0.002 inch). The reflectance (T) of the carbon black paste applied onto a glass plate is measured with a reflection photometer (Densicron, Welch Scientific Co., A9155, reflector head #3832A) which is so adjusted as to indicate 50% reflectivity for the paste of the standard carbon black sample. The tinting strength of the carbon black sample is calculated from the following formula.

Tinting strength $= 50/T \times$ [Tinting strength (%) of standard carbon black]

(4) IA

This value was determined according to the testing method for rubber-compounding carbon black, JIS K 6221 (1975), article 6.1.1. (corresponding to ASTM D 1510-81).

Namely, $0.5 + 0.0005$ g of a dried carbon black sample was precisely weighed out into a 200 ml Erlenmeyer flask with a stopper, 25 ml of a 0.0473 N iodine solution was added thereto, and the mixture was shaken for 1 min at room temperature at a shaking number of above 120 strokes/min. The carbon black was separated and 20 ml of the filtrate was titrated with a 0.0394 N sodium thiosulfate solution (a ml). Separately, a blank test was performed by the same procedure (b ml). The iodine adsorption number per g of the dried carbon black was calculated according to the following equation:

$$IA = (b-a)/b \times (V/W_D) \times N \times 126.91 \times f$$

wherein
IA: iodine adsorption number (mg/g)
$W_D$: weight of dry carbon black (g)
V: amount of iodine solution added (ml)
N: normality of iodine solution (0.047)
f: factor of iodine solution.

(5) N₂SA $N_2SA$ was measured according to ASTM D3037-86 "Standard Test Method for Carbon Black-Surface Area by Nitrogen Adsorption" Method B.

(6) $\overline{D}$st and $\Delta$Dst

A carbon black sample is dried according to JIS K6221 (1975), Section 6.2.1. Method A. The dried carbon black sample is accurately weighed out and dispersed into a 20% aqueous solution of ethanol containing a small quantity of surface active agent (dispersing agent) to prepare a dispersion of carbon black in a concentration of 50 mg/l. Complete dispersion is accomplished ultrasonically.

Then the dispersion is subjected to centrifugal classification by a disk centrifuge (made by Joyes Loebl Co., England) set to 8000 rpm. 10 to 20 ml of spin liquid (2% aqueous solution of glycerin) is added and then 1 ml of buffer (aqueous solution of ethanol) is added. Finally, 0.5 ml of the dispersion of carbon black is added by means of a syringe. Centrifugation is started. Simultaneously, the recorder is also started to draw a distribution curve of aggregates.

The Dst mode diameter ($\overline{D}$st) is defined as the equivalent Stokes diameter (nm) at the mode (maximum absorbance) of the distribution curve of aggregates, and the range of aggregate size distribution ($\Delta$Dst) is defined as the difference (nm) between two equivalent Stokes diameters at two points on the distribution curve of aggregates at which the absorbance is 50% of the maximum absorbance.

The $\overline{D}$st and $\Delta$Dst of ASTM D-24 Standard Reference Black C-3 N234 according to this measuring method are 80 nm and 60 nm, respectively.

The carbon black of the present invention satisfying the above-described characteristics requirements can be prepared by making use of a reactor of a usual oil furnace system shown in FIG. 1 and setting various conditions, such as generating reaction temperature (fuel oil combustion rate), time taken until carbon black generating reaction is ceased by introducing water into the furnace through an opening 7, flow rate of a combustion gas passing through a front small-diameter reaction chamber 2 and a rear small-diameter reaction chamber 3, respectively at values shown in the following Table 1.

EXAMPLES AND COMPARATIVE EXAMPLES:

Carbon black was prepared under various conditions by making use of an oil furnace comprising a combustion chamber 1 (a diameter of 400 mm; a length of 500 mm) provided on a reactor head and equipped with a tangential air feed port 8, a fuel oil burner 6 fitted in the direction of the reactor axis, and a feed-stock oil spray nozzle 5; a front small-diameter reaction chamber 2 (a diameter of 190 mm; a length of 1000 mm) coaxially connected to the combustion chamber, a rear small-diameter reaction chamber 3 (a diameter of 150 mm; a length of 500 mm), and a large-diameter reaction chamber 4 (a diameter of 300 mm).

An aromatic hydrocarbon oil having a specific gravity of 1.073 (15/4° C.), a viscosity of 2.10 (Engler: 40/20° C.), a benzene-insoluble of 0.03%, a coefficient of correlation (BMCI) of 140, and an initial boiling point of 103° C. was used as a stock oil, and a hydrocarbon oil having a specific gravity of 0.903 (15/4° C.), a viscosity (CST: 50° C.) of 16.1, a residual carbon content of 5.4%, a sulfur content of 1.8%, and a flash point of 96° C. was used as a fuel oil.

The production conditions and the characteristics of the produced carbon black of the present invention are shown in Tables I and II, respectively, together with Run No. Run Nos. 8 to 11 shown in Table II are conventional types of carbon black which do not satisfy the requirements of the present invention.

TABLE I

| Conditions | Run No. | | | | | | |
|---|---|---|---|---|---|---|---|
| | 1 | 2 | 3 | 4 | 5 | 6 | 7 |
| total air feed rate (Nm$^3$/hr) | 3800 | 3450 | 3800 | 3800 | 4000 | 3450 | 4200 |
| fuel oil feed rate (kg/hr) | 178 | 124 | 154 | 192 | 187 | 115 | 218 |
| fuel oil combustion rate (%) | 200 | 260 | 230 | 185 | 200 | 280 | 180 |
| combustion gas flow rate (m/sec) | | | | | | | |
| front small-diameter reaction chamber | 157 | 142 | 157 | 157 | 165 | 142 | 173 |
| rear small-diameter reaction chamber | 251 | 228 | 251 | 251 | 264 | 228 | 277 |
| feedstock oil feed rate (kg/hr) | 735 | 682 | 702 | 622 | 751 | 568 | 556 |
| reaction residence time* (msec) | 9.2 | 8.0 | 7.2 | 7.2 | 6.7 | 5.8 | 4.8 |

Note:
*Residence time taken until the formed carbon black-containing gas reaches a water cooling site.

TABLE II

| Ex. | Run No. | CTAB (m$^2$/g) | N$_2$SA (m$^2$/g) | IA (mg/g) | 24M4 (ml/100 g) | Tint (%) | Dst (nm) | ΔDst (nm) | M value | 465−1.88 [CTAB] | 465−1.18 [CTAB] |
|---|---|---|---|---|---|---|---|---|---|---|---|
| Ex. of the present invention | 1 | 125 | 145 | 138 | 124 | 115 | 80 | 65 | 244 | 230 | 318 |
| | 2 | 130 | 141 | 139 | 119 | 133 | 82 | 60 | 298 | 221 | 312 |
| | 3 | 136 | 150 | 147 | 118 | 125 | 78 | 56 | 275 | 209 | 305 |
| | 4 | 141 | 155 | 141 | 108 | 135 | 76 | 50 | 214 | 200 | 299 |
| | 5 | 143 | 160 | 152 | 117 | 125 | 70 | 49 | 258 | 196 | 296 |
| | 6 | 150 | 158 | 154 | 114 | 137 | 73 | 51 | 276 | 183 | 288 |
| | 7 | 157 | 168 | 148 | 105 | 138 | 65 | 42 | 192 | 170 | 280 |
| Comp. Ex. | 8 | 124 | 145 | 141 | 112 | 112 | 83 | 62 | 199 | 232 | — |
| | 9 | 132 | 142 | 139 | 99 | 129 | 70 | 46 | 183 | 217 | — |
| | 10 | 138 | 149 | 139 | 102 | 132 | 72 | 50 | 176 | 206 | — |
| | 11 | 154 | 167 | 154 | 103 | 135 | 65 | 51 | 160 | 175 | — |

Then, these types of carbon black were each compounded with natural rubber in a compounding ratio shown in Table III.

TABLE III

| Compounding Components | pts. wt. |
|---|---|
| natural rubber (RSS #1) | 100 |
| carbon black | 50 |
| aromatic oil (softening agent) | 4 |
| stearic acid (dispersion vulcanization assistant) | 3 |
| zinc oxide (vulcanization assistant) | 5 |
| dibenzothiazyl disulfide (vulcanization accelerator) | 1 |
| sulfur (vulcanizing agent) | 2.5 |

The compounded rubber shown in Table III was vulcanized at 145° C. to prepare a rubber composition. The rubber composition was subjected to measurement of various rubber characteristics. The results are shown in Table IV together with Run No.

The methods and conditions of the measurement of the rubber characteristics are as follows.

(1) Abrasion Loss Amount

The determination was made using a Lambourn abrasion tester (a mechanical slip type) under the following conditions.

Test Piece thickness: 10 mm outer diameter: 44 mm

Emery Wheel type: GC type
particle size: 80
hardness: H

Carborundum Powder Added particle size: #80
amount: about 9 g/min
Relative Slipping Ratio between the Emery wheel surface and the test piece: 24%, 60%
Rotation Number of the Test Piece: 535 rpm
Testing Load: 4 kg (2) Mooney Viscosity The determination was made according to JIS K6300 "Physical Testing Methods for Unvulcanized Rubber".

(3) Others

The determination was made according to JIS K6301-1975 "Physical Testing Methods for Vulcanized Rubber".

TABLE I

| | Run No. | Abrasion Loss Amount | | Hardness (Hs) | Modulus at 300% (kg/cm$^2$) | Tensile Strength (kg/cm$^2$) | Elongation (%) | Mooney Viscosity (125° C.) |
|---|---|---|---|---|---|---|---|---|
| | | LA24 (ml/5 min) | LA60 (ml/min) | | | | | |
| Ex. of the present | 1 | 0.0759 | 0.1009 | 67 | 160 | 325 | 495 | 92 |
| | 2 | 0.0751 | 0.1005 | 67 | 153 | 310 | 500 | 94 |

TABLE I-continued

| | Run No. | Abrasion Loss Amount | | Hardness (Hs) | Modulus at 300% (kg/cm²) | Tensile Strength (kg/cm²) | Elongation (%) | Mooney Viscosity (125° C.) |
| --- | --- | --- | --- | --- | --- | --- | --- | --- |
| | | LA24 (ml/5 min) | LA60 (ml/min) | | | | | |
| invention | 3 | 0.0735 | 0.1050 | 73 | 148 | 320 | 530 | 98 |
| | 4 | 0.0725 | 0.1061 | 68 | 140 | 318 | 520 | 93 |
| | 5 | 0.0717 | 0.1010 | 70 | 155 | 330 | 510 | 96 |
| | 6 | 0.0708 | 0.1032 | 73 | 150 | 310 | 510 | 95 |
| | 7 | 0.0695 | 0.1085 | 72 | 135 | 295 | 540 | 101 |
| Comp. Ex. | 8 | 0.0796 | 0.1150 | 69 | 140 | 295 | 545 | 94 |
| | 9 | 0.0788 | 0.1173 | 70 | 136 | 291 | 550 | 97 |
| | 10 | 0.0773 | 0.1139 | 69 | 143 | 302 | 535 | 98 |
| | 11 | 0.0751 | 0.1117 | 73 | 146 | 305 | 520 | 105 |

As is apparent from Table IV, when the N₂SA of carbon black is on the same level, compared with the rubber compositions of the Comparative Examples, the rubber compositions of the Examples of the present invention exhibit improved results on abrasion loss amount and other characteristics as well as on the Mooney viscosity which is a measure of the dispersion processability, i.e., exhibit a lower Mooney viscosity.

What is claimed is:

1. A carbon black for a tire tread having a cetyltrimethyl ammonium bromide specific surface area (CTAB) of 120 to 160 m²/g, a dibutyl phthalate absorption number of compressed sample (24M4) of 95 to 135 ml/100 g, and a tinting strength (Tint) of 100 to 150% and exhibits an M value defined by the following formula (1) and satisfying the following formula (2):

$$M = [24M4]^3 \times [\text{Tint}] \times \frac{[IA]^2}{[N_2SA]^2} \times \frac{[\overline{D}st]}{[\Delta Dst]} \times 10^{-6} \quad (1)$$

$$465 - 1.88\,[\text{CTAB}] \leq M \leq 465 - 1.18\,[\text{CTAB}] \quad (2)$$

wherein IA is the iodine adsorption number (mg/g), N₂SA is the nitrogen adsorption specific surface area (m²/g), $\overline{D}$st is the equivalent Stokes diameter (nm) at the maximum absorbance of the distribution curve of aggregates determined by the centrifugal classification method, and ΔDst is the difference (nm) between two equivalent Stokes diameters at two points on the distribution curve of aggregates at which the absorbance is 50% of the maximum absorbance.

* * * * *